TRANSISTOR AUTOMATIC FREQUENCY CONTROL
Filed July 19, 1954
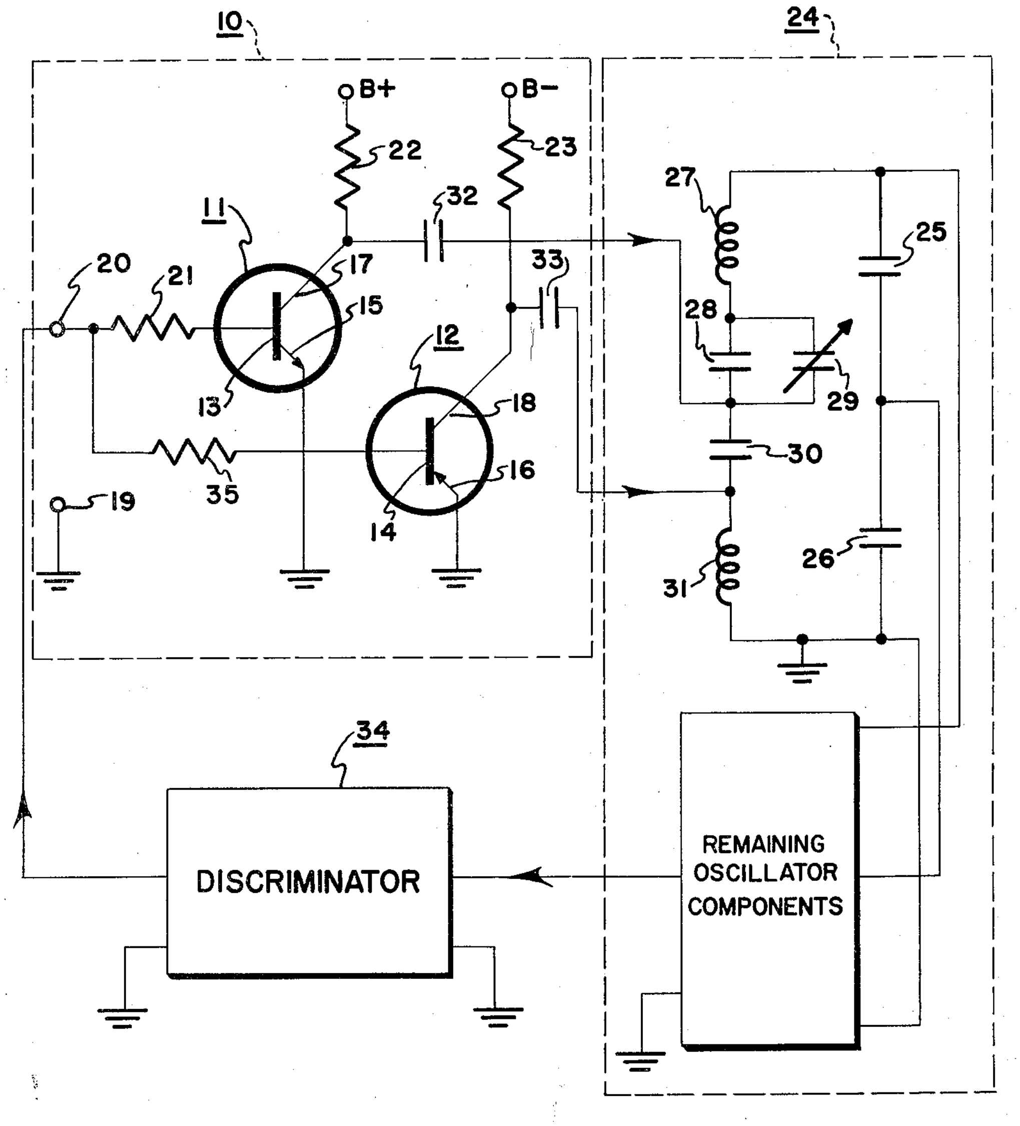
JAMES M. BUCHANAN
CARROLL A. LEEDY
*INVENTORS*
*BY* Bruce L. Birchard
THEIR ATTORNEY United States Patent Office 2,764,687
Patented Sept. 25, 1956

2,764,687

TRANSISTOR AUTOMATIC FREQUENCY CONTROL

James M. Buchanan, North Hollywood, and Carroll A. Leedy, Inglewood, Calif., assignors to Hoffman Electronics Corporation, a corporation of California Application July 19, 1954, Serial No. 444,122

3 Claims. (Cl. 250—36)

This invention is related to automatic frequency control systems and, in particular, to an improved automatic frequency control system which employs transistors exclusively.

In the past, many automatic frequency control systems have been devised. Those currently in use are very satisfactory. However, for some purposes, it becomes important to conserve space by employing recently developed junction-type transistors in the AFC circuitry. Junction-type transistors currently in use lend themselves readily to many types of oscillator and discriminator circuits. The problem in the art of AFC systems has been to devise a transistor circuit which, when driven by the output of a conventional discriminator, will function to change the reactance, and hence the frequency, of the oscillator tank circuit.

Therefore, it is an object of this invention to provide an improved automatic frequency control system which will lend itself to compactness and miniaturization.

It is a further object of this invention to provide an automatic frequency control system which will employ transistors exclusively.

It is an additional object of this invention to provide an improved automatic frequency control system which will be characterized by low power consumption.

According to this invention, a conventional Clapp oscillator is frequency controlled by a transistor circuit. The reactance control portion of the transistor automatic frequency control system according to this invention consists of a plurality of transistors coupled between the discriminator and the input side of the Clapp oscillator. Transistors are known to have the unique characteristic of presenting variable resistance with varying input voltages. This characteristic is employed to change the reactance, and hence the resonant frequency, of the Clapp oscillator in use.

The features of the present invention which are believed to be novel are set forth with particularity in the appended claims. The present invention, both as to its organization and manner of operation, together with further objects and advantages thereof may best be understood by reference to the following description taken in connection with the accompanying drawing, in which:

The sole figure is a schematic diagram of a transistor automatic frequency control system according to this invention.

In the sole figure, reactance control circuit 10 includes N–P–N junction transistor 11 and P–N–P junction transistor 12 having bases 13 and 14, emitters 15 and 16, and collectors 17 and 18, respectively. Input terminal 19 of reactance control circuit 10 is maintained at ground potential. Input terminal 20 is connected through base resistor 21 to base 13 of transistor 11, and also through base resistor 35 to base 14 of transistor 12. Emitter 15 of transistor 11 and emitter 16 of transistor 12 are maintained at ground potential. Collector 17 of transistor 11 is connected through collector resistor 22 to a source of positive voltage (B+) with respect to the common reference potential (ground). Collector 18 of transistor 12 is connected through collector resistor 23 to a source of negative voltage (B−) with respect to said common reference potential. The tank circuit of Clapp oscillator 24 consists of a capacitive leg and an inductive-capacitive leg. The capacitive leg is center tapped and consists of capacitor 25 and capacitor 26. The inductive-capacitive leg of the oscillator tank circuit consists of inductance 27, capacitors 28 and 29, capacitor 30, and inductance 31, all of which are connected in series, in that order. Collector 17 of transistor 11 is connected through capacitor 32 to the junction of capacitors 28, 29 and 30. Collector 18 of transistor 12 is connected through capacitor 33 to the junction of capacitor 30 and inductance 31. The output side of oscillator 24 is coupled directly to discriminator 34. The output circuit of discriminator 34 is coupled directly to input terminal 20 of reactance control circuit 10.

The circuitry of the sole figure operates as follows. A Clapp oscillator similar to that indicated by oscillator 24 in the sole figure is not new to the electronics industry. It has been used in this country for perhaps ten years; in Great Britain, the Clapp oscillator has existed in one form or another for a considerably longer time. A Clapp oscillator has remarkable stability characteristics, its chief physical feature being that of employing a combination of series and parallel resonant circuits as the tank circuit—both resonant frequencies being nearly equal. Such an oscillator has been shown to be much more stable than the conventional Colpitts oscillator. As shall be hereinafter described, the Clapp oscillator was chosen with regard to the present invention not only for its characteristics of stability but also for reasons which concern the series-resonant portion of the circuit. Transistors 11 and 12 simulate variable resistors which vary in the resistance offered from 150,000 ohms at cutoff to approximately 5 ohms at saturation. The resistance exhibited by transistors appears, empirically, to be a linear function of the input voltage. Assuming that the oscillator stage 24 is on-frequency, discriminator 34 will exhibit no D. C. output voltage and transistors 11 and 12 will be cut off (neglecting the leakage current which will be in the range of microamperes). If the frequency of the oscillator drifts negatively, then we assume a negative output voltage from the discriminator. Transistor 11 will remain cut off; however, transistor 12 will conduct. Accordingly, the effective resistance of transistor 12 will drop, in amount depending upon the magnitude of the discriminator output voltage. This resistance drop will reduce the effective inductive reactance of inductance 31 and consequently will raise the frequency of the oscillator tank circuit to its initial value. The degree to which the effectiveness of inductance 31 is reduced in the oscillator tank circuit will depend upon the relative effective resistance of transistor 12, and hence upon the magnitude of the negative output voltage from discriminator 34.

If instead, the frequency of the oscillator were to drift positively, we will assume a positive D. C. output voltage from discriminator 34, and then transistor 12 will be cut off, but transistor 11 will conduct. The conductivity of transistor 11 will, again, depend upon the magnitude of the positive output voltage from discriminator 34. Now we arrive at the reasons for the use of a Clapp-type oscillator (in addition to the Clapp oscillator's characteristic of a high degree of stability). The reason for employing the Clapp oscillator in the present invention is to take advantage of capacitance in the inductance leg of the tank circuit. Upon positive frequency drifts by the oscillator, and subsequent positive D. C. signals from the discriminator, transistor 12 will remain cut off while transistor 11 will conduct, the degree of this conduction being, of course, dependent upon the magnitude of the positive signal from discriminator 34. By reason of this conduction, transistor 11 will insert capacitor 32 in parallel with capacitor 30 of the oscillator tank circuit, thereby lowering the frequency of the tank circuit. Again, in either case, that is, whether the frequency of the oscillator drifts positively or negatively, the action of the variable reactance circuit 10 will be such as to return the frequency of the Clapp oscillator to its initial condition.

In actual practice, capacitor 28 is generally shunted by the tuning capacitor (capacitor 29) in which case the value of capacitor 29 need not be very high in order to obtain a wide operating frequency range. Of course, capacitor 28 may be eliminated from the present circuitry without preventing its operation.

It is accordingly seen that a new and useful automatic frequency control system employing transistors exclusively has been devised. Such a circuit will readily lend itself to compactness in instances in which compactness and miniaturization are of prime importance. It is believed that the present invention takes an important step beyond the present progress and usage of transistor circuits.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. An automatic frequency control system employing junction-type transistors and including, in combination, an oscillator, a discriminator coupled to said oscillator, and a reactance control circuit coupled to said discriminator and also to said oscillator to complete the automatic frequency control circuit loop, said oscillator including a tank circuit having a capacitive leg and an inductive-capacitive leg, said inductive-capacitive leg including a first inductor, a variable capacitor, a fixed capacitor, and a second inductor connected in series in that order, said reactance control circuit including first and second transistors of opposite junction characteristics each transistor having an input circuit and an output circuit, said transistor input circuits being coupled to each other and to said discriminator, said output circuit of said first transistor being capacitively coupled to the junction point of said variable capacitor and said fixed capacitor of said oscillator tank circuit, and said output circuit of said second transistor being capacitively coupled to the junction point of said fixed capacitor and said second inductor of said oscillator tank circuit.

2. An automatic frequency control system employing junction-type transistors and including, in combination, an oscillator, a discriminator coupled to said oscillator, and a reactance control circuit coupled to said discriminator and also to said oscillator to complete the automatic frequency control circuit loop, said oscillator including a tank circuit having a capacitive leg and an inductive-capacitive leg, said inductive-capacitive leg including a first inductor, a variable capacitor shunting a first fixed capacitor, a second fixed capacitor, and a second inductor connected in series in that order, said reactance control circuit including first and second transistors of opposite junction characteristics each transistor having an input circuit and an output circuit, said transistor input circuits being coupled to each other and to said discriminator, said output circuit of said first transistor being capacitively coupled to the junction point of said variable capacitor, said first fixed capacitor, and said second fixed capacitor of said oscillator tank circuit, and said output circuit of said second transistor being capacitively coupled to the junction point of said second fixed capacitor and said second inductor of said oscillator tank circuit.

3. A reactance control circuit for employment in an automatic frequency control system comprising, in combination, an N–P–N junction transistor having emitter, collector, and base terminals, said emitter being maintained at a common reference potential, a first input terminal maintained at said common reference potential, a second input terminal, said first and second input terminals being adapted for coupling to a discriminator, a first resistor coupled between said second input terminal and said base terminal of said N–P–N junction transistor, a second resistor having two terminals, one terminal of which said second resistor being maintained at a potential which is positive with respect to said common reference potential, the remaining terminal of said second resistor being coupled to said collector terminal of said N–P–N junction transistor, a first output terminal, a first capacitor coupled between said first output terminal and said collector terminal of said N–P–N transistor, a P–N–P junction transistor having emitter, base, and collector terminals, said emitter terminal being maintained at said common reference potential, a third resistor coupled between said second input terminal and said base terminal of said P–N–P junction transistor, a fourth resistor having two end-terminals, said first end-terminal of said fourth resistor being maintained at a potential which is negative with respect to said common reference potential, said remaining end-terminal of said fourth resistor being coupled to said collector terminal of said P–N–P junction transistor, a second output terminal, an oscillator having a resonant circuit provided with a capacitive element coupled between said first and second output terminals, and a second capacitor coupled between said second output terminal and said collector terminal of said P–N–P junction transistor.

References Cited in the file of this patent

UNITED STATES PATENTS

| | | |
|---|---|---|
| 2,559,023 | McCoy | July 3, 1951 |
| 2,666,819 | Raisbeck | Jan. 19, 1954 |
| 2,666,902 | Koros | Jan. 19, 1954 |